July 2, 1968  B. R. McLEAN  3,391,372
ELECTRIC HEATING UNIT
Filed May 16, 1966  2 Sheets-Sheet 1

INVENTOR
Byron R. McLean.
BY
Charles W. Gregg
AGENT

United States Patent Office 3,391,372
Patented July 2, 1968

3,391,372
ELECTRIC HEATING UNIT
Byron R. McLean, Painted Post, N.Y., assignor to Corning Glass Works, Corning, N.Y., a corporation of New York
Filed May 16, 1966, Ser. No. 550,329
1 Claim. (Cl. 338—290)

ABSTRACT OF THE DISCLOSURE

A heating unit employing a plurality of ribbon-like electrical resistance heating elements sinuously wound on a card of a dielectric material through notches of different depths on each of a pair of opposite edges of said card so that the elements extend parallel with each other on the front of the card and cross each other adjacent said edges and on the back of the card without contact between such elements. The bottom borders of said notches are sloped to enable the looping of the ribbon-like elements through said notches without folding, creasing or undue twisting of the elements.

---

Figure 1:
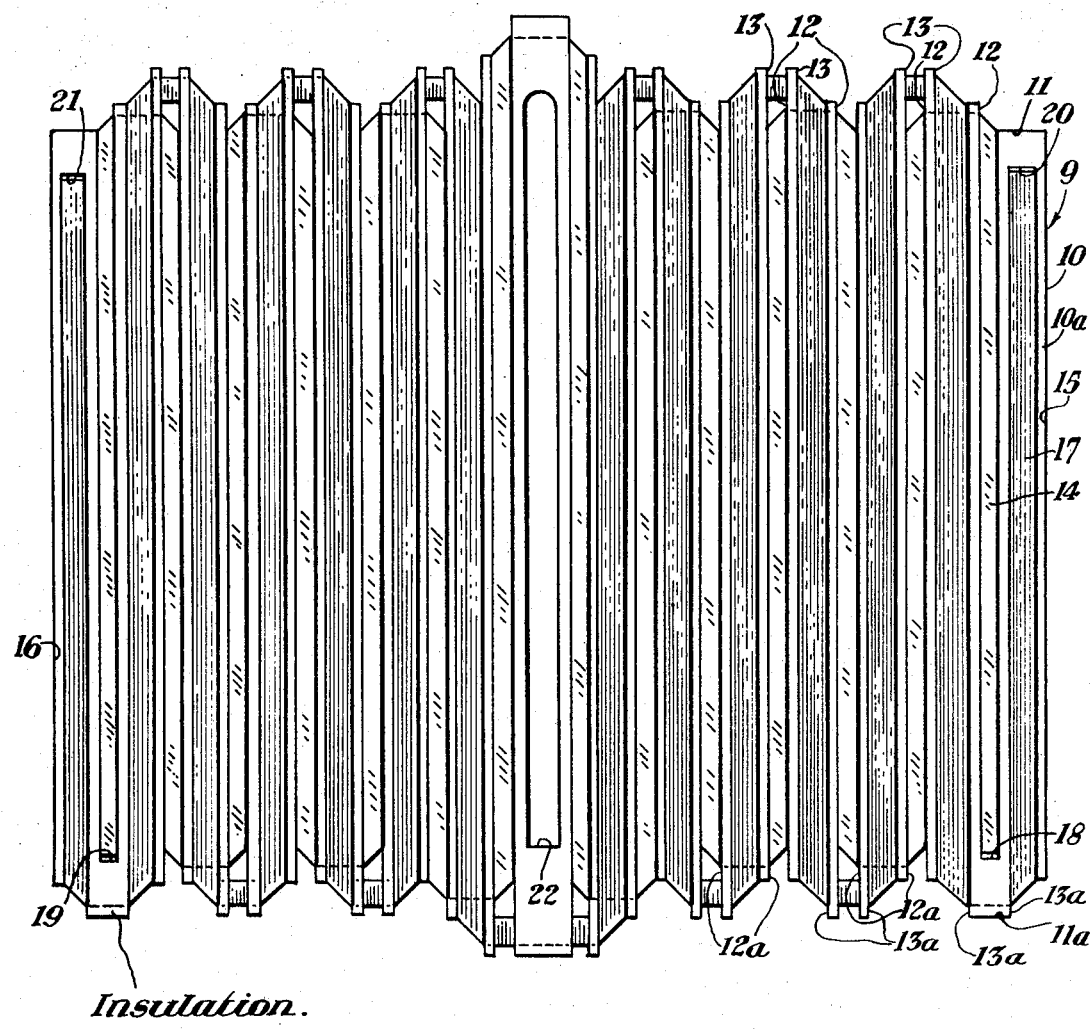

The present invention relates to a heating unit. More particularly the present invention relates to an electrical heating unit and the method of fabricating such unit. Still more specifically the present invention relates to an electrical heating unit for use in an item, such as an electric hot plate for example, employing a plurality of electrical resistance heating elements for selective temperature control of the item.

There is disclosed, for example, in copending application Ser. No. 507,380, filed Nov. 12, 1965, by Garo M. Ziver for Cooking Surfaces, a glass-ceramic panel having on one surface thereof at least one "burner" area which is to be used for cooking purposes. For such purposes it is intended that an electric heating unit be provided adjacent the surface of said panel opposite said one surface and below each said area. In conjunction with such a panel, for good control of the temperature of such a burner area and, thereby, the temperature of foods being cooked in vessels placed on such area, it is sometimes desirable that a heating unit comprising at least two electrical resistance heating elements be employed. The energization of such elements can then be selectively cycled or selected by a temperature sensor so that the elements may be energized either singly or both at the same time to regulate the heat supplied to the cooking vessel being used.

In addition to the above desirable feature, for optimum cooking control, it is expedient that the heat supplied to the bottom of the cooking vessel being employed be evenly distributed beneath such bottom at all times. That is to say, in addition to proper temperature control, uniform heat distribution across the bottom of a cooking vessel provides optimum cooking conditions. It will be apparent, therefore, that when a heating unit employing two or more electrical resistance heating elements is employed for cooking purposes, it is desirable that such elements be disposed substantially parallel with each other throughout their etxent so that, regardless of whether only one element or both elements are energized, the heating unit will provide a substantially uniform distribution of heat throughout its areal expanse.

In view of the above, it is one object of the present invention to provide an electric heating unit incorporating a plurality of serpentinely wound electrical resistance heating elements extending parallel with each other substantially throughout the entire length of each element.

It is another object of the present invention to provide an electric heating unit employing a plurality of electrically resistance heating elements sinuously wound on a card of dielectric material so that the elements are disposed parallel with each other adjacent one side of the card substantially throughout the full lengths of the elements.

It is a third object of the invention to provide a method of serpentinely winding a plurality of electrical resistance heating elements on a card of dielectric material so that the elements extend parallel with one another and also cross each other at selected points without contact therebetween.

In accomplishing the above objects of the invention a card of a dielectric material is selectively rabbeted on opposite edges thereof to provide a series of notches through which a plurality of electrical resistance heating elements may extend so as to cross each other without contact therebetween, such elements being serpentinely or sinuously wound on said card so as to extend back and forth across one side of the card in parallel relationship with one another.

Other objects and characteristic features of the invention will become apparent as the description proceeds.

It is to be understood that, although the heating unit herein disclosed is ideally suitable for use with cooking surfaces such as disclosed in the aforementioned patent application of Garo M. Ziver, it is not intended that such a unit be confined to such use but that such a unit may be used with other electrically heated devices such as electric toasters, electric irons etc.

Figure 2:
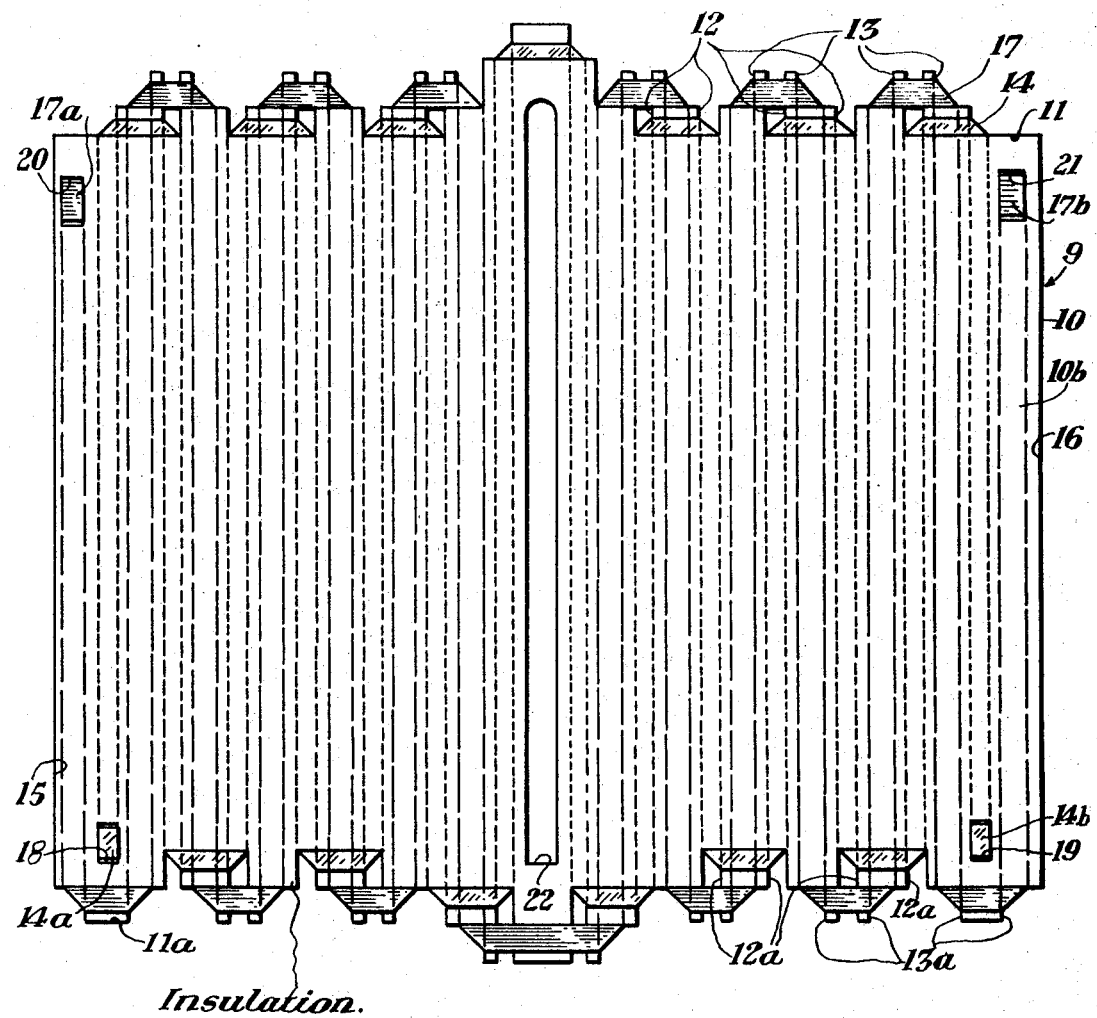

The invention will best be understood with reference to the accompanying drawings wherein:

FIG. 1 is an elevational view of the front or one side of an electric heating unit in accordance with the invention, and FIG. 2 is an elevational view of the back or opposite side of the unit of FIG. 1.

Similar reference characters refer to similar parts in each of the figures of the drawings.

Referring to the drawings in detail, there is shown a heating unit 9 including a rectangular, relatively thin but rigid, panel or card 10 of a dielectric material, such as mica for example. One edge 11 of card 10 is rabbeted to provide in alternation therealong a series of first and second spaced-apart notches such as 12 and 13 of first and second depths, respectively. The edge of card 10 opposite edge 11 is similarly rabbeted to provide therealong a series of notches 12a and 13a corresponding to notches 12 and 13, respectively, provided in edge 11. Such opposite edge is designated in the drawings by the reference character 11a.

A first electrical resistance heating element 14 is contiguously mounted against the front side 10a of card 10 by being wound progressively back and forth across such card from near one unnotched edge 15 of the card toward the other unnotched edge 16 of the card and parallel with such edges, such element extending through successive adjacent pairs of notches 12 rabbeted in edge 11 of the card and through successive adjacent pairs of notches 12a rabbeted in edge 11a of the card, and across the back 10b of the parts of the card between each said pair of notches thereby providing the reversal of the element in its back and forth path across the front of card 10. First and second ends 14a and 14b of element 14 extend through orifices or holes 18 and 19, respectively, provided in card 10, and are secured to back 10b of the card in any suitable or convenient manner, such as by a suitable adhesive or cement for example.

A second electrical resistance heating element 17 is mounted on front side 10a of card 10 in a manner similar to the element 14 and extends parallel with element 14 progressively back and forth across the front of such card from adjacent the edge 15 of the card toward edge 16 thereof. Element 17 extends through successive adjacent pairs of notches 13 and notches 13a and across back 10b of the portions of card 10 between each respective pair of said notches, thereby providing for reversal of such element in its back and forth path across the front of card 10. First and second ends 17a and 17b of element 17 extend through orifices or holes 20 and 21, respectively, provided in card 10, and are secured to back 10b of the card in a manner similar to that in which ends 14a and 14b of element 14 are so secured.

It is believed readily apparent that by mounting elements 14 and 17 on card 10 in the manner described, such elements are arranged to cross each other adjacent the rabbeted edges 11 and 11a of the card without contact between the elements. The illustrated parallel relationship of elements 14 and 17 is thus attained, thereby providing for the aforementioned uniform distribution of heat when heating unit 9, comprising card 10 and its associated elements 14 and 17, are employed, for example, for cooking purposes as previously discussed. That is to say, elements 14 and 17 may be electrically energized either singly or in combination and the heat provided by heating unit 9 is, thereby evenly distributed across the areal expanse of such unit.

It should be pointed out that heating elements 14 and 17 are illustrated in the drawings as ribbons of an electrical resistance material and, therefore, the bottom borders of notches 12, 12a, 13 and 13a are sloped so that the path in which such ribbons extend may be conveniently reversed without undue twisting, creasing or folding of the ribbons. This is believed to be readily apparent. If the resistance heating elements are formed of electrical resistance wire rather than ribbon, the bottoms of said notches would not, of course, need necessarily be sloped as illustrated.

It is further pointed out that element 17 is illustrated in the drawings as being of a somewhat greater width than element 14. The elements are so shown for purposes of ease in readily distinguishing between the elements in viewing the drawings, and such elements may be of the same width, as well as of different widths as illustrated in the drawings.

As will be readily apparent to those skilled in the art, in utilizing heating unit 9, ends 14a and 14b of element 14, and ends 17a and 17b of element 17 are connected across a suitable source or sources of electric current for energization of the elements. The electrical connections to said ends of elements 14 and 17 may be made by any of the well-known and convenient techniques, such as soldering etc.

Card 10 is also illustrated in the drawings as having an elongated slot 22 extending across the center of the card normal to edges 11 and 11a of the card. Such slot is for the purpose of accommodating a temperature sensor or thermostat for selective control of heating elements 14 and 17, but the slot and said sensor do not themselves form an essential part of the present invention and no further discussion thereof is necessary.

Although there is herein shown and discussed in detail only one embodiment of the present invention, it will be understood that various changes and modifications may be made therein within the scope of the appended claim without departing from the spirit and scope of the invention.

What is claimed is:
1. A heating unit comprising, in combination,
  (A) a rectangular card of a dielectric material, each edge of a pair of opposite edges of said card having a series of first and second spaced-apart notches of first and second depths, respectively, rabbeted in alternation therealong, the notches in one edge of said pair of edges corresponding to those in the other edge of such pair and all of such notches having sloping bottom borders;
  (B) a first ribbon-like electrical resistance heating element supported on said card and sinuously wound on a front side of such card normal to said notched edges and progressively from one unnotched edge of the card toward the other such edge, such element being successively looped through adjoining pairs of said first notches and across the back side of said card; and
  (C) a second ribbon-like electrical resistance heating element supported on said card and extending parallel with said first resistance element on the front and back sides of such card, such element being successively looped through adjacent pairs of said second notches and across the back side of said card so as to successively cross said first element without contact therewith.

References Cited
UNITED STATES PATENTS

| 971,101 | 9/1910 | Van Aller | 336—223 |
| 1,392,944 | 10/1921 | Jessup | 338—290 |
| 2,316,699 | 4/1943 | Myers | 338—282 X |
| 2,464,147 | 3/1949 | Myers | 338—287 X |

LARAMIE E. ASKIN, *Primary Examiner.*

E. GOLDBERG, *Assistant Examiner.*